United States Patent [19]
Mahmoud

[11] Patent Number: 6,061,745
[45] Date of Patent: May 9, 2000

[54] BBS ONE BIOS IMAGE MULTICARD SUPPORT

[75] Inventor: Fadi A. Mahmoud, Fremont, Calif.

[73] Assignee: Adaptec, Inc., Milpitas, Calif.

[21] Appl. No.: 09/133,736

[22] Filed: Aug. 13, 1998

[51] Int. Cl.[7] .............................. G06F 9/00; G06F 9/445; G06F 13/10; G06F 12/00
[52] U.S. Cl. ................................... 710/1; 713/2; 709/301
[58] Field of Search .................... 713/1, 2, 100; 710/1, 10, 72, 266; 709/300, 301, 305, 222; 711/102, 104; 365/218

[56] References Cited

U.S. PATENT DOCUMENTS

| | | |
|---|---|---|
| 5,430,845 | 7/1995 | Rimmer et al. . |
| 5,680,556 | 10/1997 | Begun et al. . |
| 5,905,888 | 5/1999 | Jones et al. . |
| 5,951,684 | 9/1999 | Jeon . |
| 5,951,685 | 9/1999 | Stancil . |

OTHER PUBLICATIONS

Unknown, "ASUS PCI–DA2100 PCI to SCSI Disk Array Controller", User's Manual, Nov. 1996, Rev. 1.22, ASUS-TeK Computer, Inc.

*Primary Examiner*—Gopal C. Ray
*Attorney, Agent, or Firm*—Martine Penilla & Kim, LLP

[57] ABSTRACT

A boot sequence adapted for use with a computer system during execution of system BIOS. The computer system includes a random access memory (RAM), a selected number of controllers. Each of the controllers reside in a respective expansion slot (e.g., PCI slot), have at least one drive associated therewith, and have an option read only memory (Option ROM) that includes a BIOS initialization code and a runtime code. The boot sequence includes: (a) ascertaining the number of controllers residing in the expansion slots; (b) executing the BIOS initialization code associated with a first one of the controllers to create within the RAM an initial drives' structure (IDS) corresponding to the controllers; (c) suppressing the Option ROM of all but the first one of the controllers; (d) building a PNP linked list according to predefined boot priority by the user (e) building within the RAM a global drives' structure (GDS) corresponding to a pre-defined boot sequence priority that designates a selected one of the controllers as a boot controller, and the GDS is in the form of a listing of drives each having an addressable location within the readable memory; and (f) booting from an entry pointer in the GDS to execute the runtime code for the boot controller having a highest user selected priority.

23 Claims, 8 Drawing Sheets

BBS ONE BIOS IMAGE MULTICARD SUPPORT

BACKGROUND OF THE INVENTION

1. Field of the Invention

This invention relates generally to the field of computing technology and more particularly concerns the boot sequence of a computer system which prepares the system for loading an operating system.

2. Description of the Related Art

Perhaps the most revolutionary development in recent years to impact the human condition has been the technological advances in the personal computer. The processor speed and memory capacity of today's generation of workhorse computers far exceed those of previous generations and are increasing exponentially as technology rapidly develops.

An important aspect of computer systems today is a boot sequence, or initialization routine, whereby a computer system is prepared for operation by ultimately loading an operating system (i.e. during booting). Initialization generally involves ascertaining the availability and status of hardware devices and resetting counters, switches, registers or other storage contents to starting values to prepare the system for data processing. To this end, and as generally introduced in prior art FIG. 1(a), a simplified computer system 10 has a mother board 12 upon which resides, among other components, a CPU 14, system RAM 16 and system ROM BIOS 18. These three components communicate with one another along a host bus 13 which is in communication with a PCI bus 20 via a bus bridge 15 that manages communication between the buses, performs deadlock resolution, and updates memory accesses as is well known in the art. During initialization, a program counter informs CPU 14 of the address of the next instruction needed for processing. Here, the address is the beginning of a boot program permanently stored in a set of ROM chips that comprise part of system ROM BIOS 18 and contain the computer's basic input/output system (BIOS).

Figure 1A:
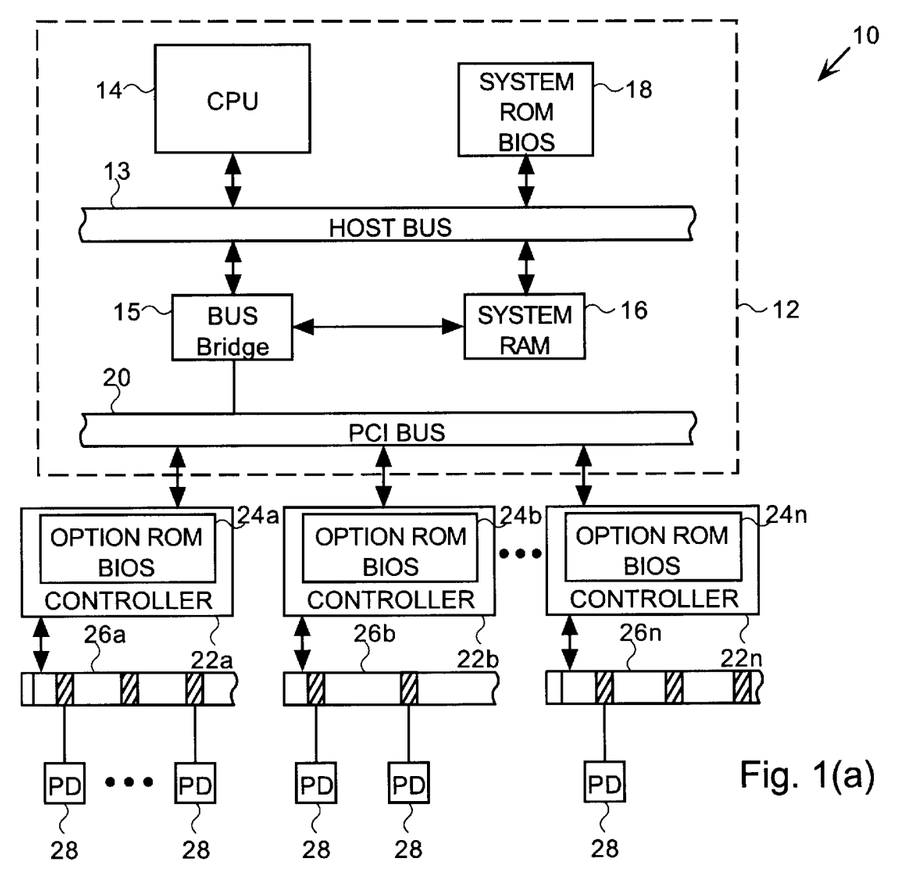
FIG. 1(a) is a block diagram of a computer system constructed according to the prior art and showing a plurality of controllers interconnected to the computer system's memory and processing components via a PCI bus.

Upon execution of the system ROM BIOS, the ROM BIOS boot program invokes a series of system checks to ascertain the location, number and identity of various devices associated with computer system 10. To accomplish this, CPU 14 transmits signals over the system's PCI bus 20 to ensure they are functioning properly. Mother board 12 includes a plurality of expansion slots (i.e., PCI slots that are connected to the PCI bus 20), each of which may contain a controller, such as controllers 22a, 22b . . . 22n. Each of these controllers may be, by way of example only, a display adapter, a hard disc controller, a floppy disc controller, a network adapter, an SCSI card or other similar device. For computer systems operating in a windows environment, many of these devices are of the plug and play (PNP) type. Physically connected to each of controllers 22a . . . 22n is a selected number of peripheral devices (PD) 28, or drives, such as a bootable CD ROM driver, a container (CNTR) or a pass-through (PT) driver. Each peripheral device 28 is interconnected to its associated controller 22a, 22b . . . 22n by an appropriate interface (i.e., such as a SCSI bus), 26a, 26b . . . 26n, respectively. Also associated with each of the controllers is the controller's firmware code, which is referred to as the Option ROM BIOS, such as Option ROM BIOS 24a, 24b . . . 24n.

Figure 1B:
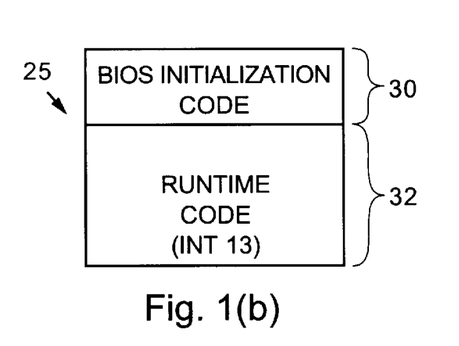
FIG. 1(b) is a block diagram representing the Option ROM BIOS for a conventional prior art controller, and specifically showing the BIOS initialization code and the run time code portions thereof.
Figure 1C:
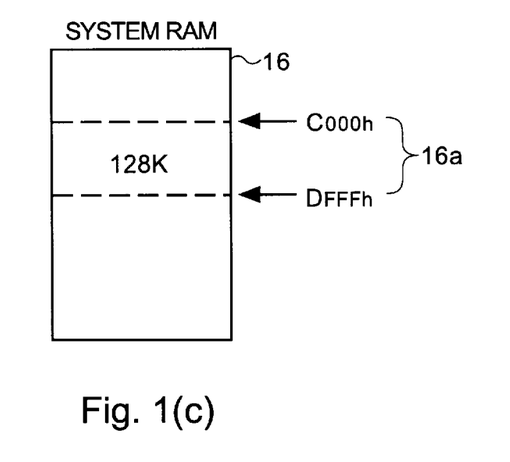
FIG. 1(c) is a block diagram illustrating that portion of a conventional system RAM which is reserved for Option ROM BIOS.

The initialization routine incorporates each of the controller's Option ROM BIOS code into the system RAM 16 as part of the system's overall BIOS and memory configuration. As shown in FIG. 1(b), each Option ROM BIOS 25 includes a first memory allocation 30 for the controller's BIOS initialization code and a second memory allocation 32 for the controller's run time code, which is essentially an INT13 call allowing computer system 10 to communicate with the controller's peripheral device(s). Allocated within system RAM 16 is a memory block 16a of approximately 128 k that is commonly allocated at hexadecimal addresses C000h, through DFFFh, as shown in FIG. 1(c). It is this 128 k of memory within system RAM 16 that is reserved for Option ROM BIOS 24a, 24b . . . 24n.

Figure 1D:
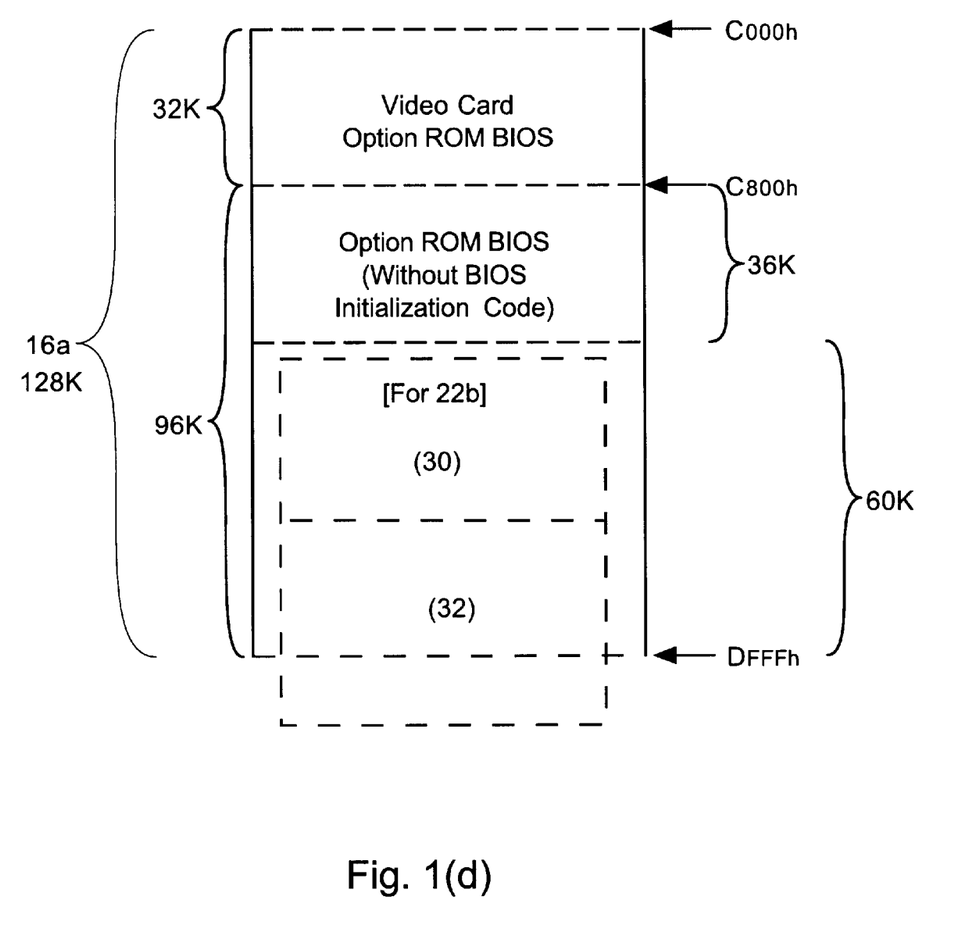
FIG. 1(d) is a block diagram of the reserved memory portion for the system RAM depicted in FIG. 1(c) and illustrating its limited capacity for loading the Option ROM BIOS of the respective controllers.

As shown in FIG. 1(d), it is not uncommon for the Option ROM BIOS associated with the computer system's video card to require approximately 32 k of memory block $16_a$ between addresses C000h through C800h, thereby leaving a remainder of only 96 k between addresses C800h and DFFFh allocated for containing the Option ROM BIOS of the remaining controllers. In many situations, this is insufficient memory capacity in which to load the Option ROM BIOS of the remaining controllers. For example, and as also illustrated in FIG. 1(d), it is possible for the run time code of the second controller, being that part of the Option ROM BIOS (which does not include the BIOS initialization code), to require 36 k of memory, thereby leaving 60 k allocated for the Option ROM BIOS of controller 22b. In cases where option ROM BIOS (initialization and run time) is a size of 64 k for controller 22b, the system will not have enough memory space to accommodate this controller code, and hence will choke on it. This scenario is further complicated by the fact that newer chip sets manufactured by the Intel Corporation of Santa Clara, Calif., only allocate memory within system RAM 16 in 16 k blocks, as opposed to the 2 k block memory allocations prevalent in older Intel chip sets. So, for example, even if the Option ROM BIOS for controller 22b required 50 k of memory, an amount less than the available 60 k remaining in system RAM 16 after loading controller 24a, it could not be loaded within memory block 16a because the chip set would effectively require a minimum of 64 k of available space.

The inability to load the Option ROM BIOS of each of the controllers as shown in the scenario above, which represents one of many possible such scenarios, ultimately renders the computer system unable to boot from any controller card who's Option ROM BIOS has not been loaded into system RAM. This not only hinders the versatility of the computer system by jeopardizing the user's ability to designate a desired boot drive, but it can also cause a system failure if the controller whose Option ROM BIOS has been loaded does not contain the operating system.

In view of the foregoing, what is needed is a new and improved methodology for use in a computer system to optimize versatility and efficiency by allowing the computer system to boot from any controller, irrespective of the number of controllers present in the system without choking the available memory. To this end, it is also desirable to accomplish such versatility within the memory confinements of today's computer systems, as discussed hereinabove.

SUMMARY OF THE INVENTION

Broadly speaking, the present invention fills these needs by providing a new and useful method adapted for use with a computer system during execution of system BIOS, which boot sequence involves utilization of only one option ROM code capable of booting from any card and changing the settings on any card. To this end, the computer system includes a random access memory (RAM) and selected number of controllers each residing in a respective expansion slot. Each controller also has at least one drive associated with it and an Option ROM, that includes a BIOS initialization code and a run time code.

According to the boot sequence, the number of controllers residing in the expansion slots is initially ascertained. The BIOS initialization code associated with a first one of the controllers is then executed to create within the system RAM an initial drive's structure (IDS) corresponding to all existing controllers. The Option ROM associated with all but the first one of the controllers is then suppressed by the first running option ROM and a global drive's structure (GDS) is built within system RAM corresponding to a pre-defined boot sequence priority by BIOS Boot Specification (BBS) that designates a selected one of the controllers as a boot controller. The GDS is preferably in the form of a listing of drives each having an addressable location within the system RAM, with there being an entry pointer associated with the first one of the drives in the GDS listing. The entry pointer for the GDS may be at device value of 80h so that the operation of booting can be accomplished by an INT 13 call. Once the GDS is built, the booting operation takes place from the entry pointer, thereby to execute the run time code for the boot controller.

The operation of ascertaining the number controllers may be accomplished by scanning each of the controllers, preferably with a PCI standard call, FindPCIDevice, to retrieve identifying information pertaining thereto. The operation of building the IDS is preferably accomplished by sequentially scanning each of the controllers for selected types of drives to obtain drive data associated with each of these controllers. It is also preferred that the operation of building the GDS include creating a link list of header structures correlated to the selected number of controllers, with there being an initialization code entry address within the system RAM for each of the controllers in the link list. An order value may then be assigned to each of the controllers in the link list according to the pre-defined boot sequence priority set by the user so that, thereafter, the drive data associated with each of the controllers may be sequentially stored in the local memory of the first coded option ROM according to the order value.

Advantageously, the present invention resolves the drawbacks of existing boot sequences, which can jeopardize a user's ability to boot from a selected controller and/or drive, by providing a new and improved boot sequence which optimizes versatility and efficiency by allowing the computer system to boot from any controller, irrespective of the number of controllers present in the system. Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a new and improved boot methodology adapted for use with a computer system during execution of system BIOS. It will be obvious, however, to one skilled in the art, that the present invention may be practiced without some or all of these specific details. In other instances, well known process operations have not been described in detail in order not to unnecessarily obscure the present invention.

The boot sequence of the present invention is adapted for use with a computer system during execution of system BIOS. For purposes of the disclosure herein, the computer system preferably includes a read only memory (ROM) with a boot program stored therein, an addressable random access memory (RAM) and a selected number of controllers or host adapters, each of which resides in a respective expansion slot (e.g., such as a PCI slot) on the computer system's motherboard. Each of these controllers may have at least one peripheral device, or drive, associated therewith and an option read only memory (Option ROM) that includes a BIOS initialization code and a run time code. As discussed above in the background section, the inability under certain circumstances for the Option ROM BIOS of each of the controller cards to be loaded into system RAM hinders the versatility of the computer system by jeopardizing the user's ability to designate a desired boot drive.

Therefore, in one embodiment of the present invention, the entire BIOS, including initialization code and run time code, will occupy no more than 32 k of memory within the system RAM. Of course, this preferred optimal size may vary depending on the memory requirements of a given computer. To this end, the boot method preferably loads only one controller's Option ROM BIOS into the system RAM between memory locations C800h through DFFFh, which Option ROM BIOS is capable of communicating with all of the controllers on the computer system's motherboard and suppress their respective option ROM BIOS. With this simplified versatility, the computer system is capable of booting from any controller and changing the settings on any controller through the utilization of only a single run time code.

Figure 2:
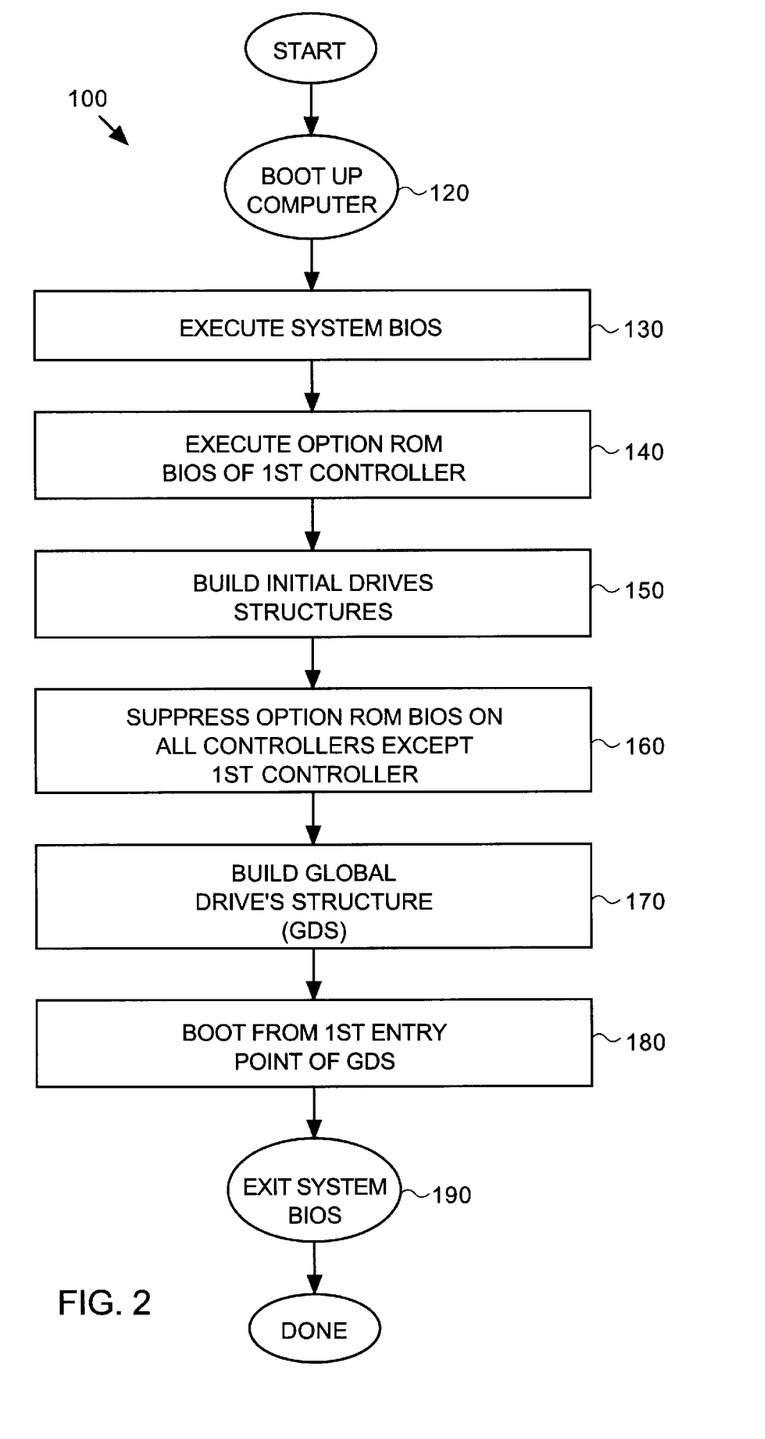
FIG. 2 is a schematic flow chart depicting the boot sequence methodology according to the principal concepts of the present invention.

With initial reference then to FIG. 2, it may seen that a flow chart is provided to explain the implementation of the boot sequence. The implementation begins when the computer system is booted up in operation 120, and then the method proceeds to execute the system BIOS at 130. A preliminary operation at this stage, shown at 140, is to execute the Option ROM BIOS associated with the first controller. That is, the initialization routine incorporates the first controller's Option ROM BIOS code, which includes an initialization code and a run time code, into the system RAM as part of the system's overall BIOS and memory configuration.

Figure 3A:
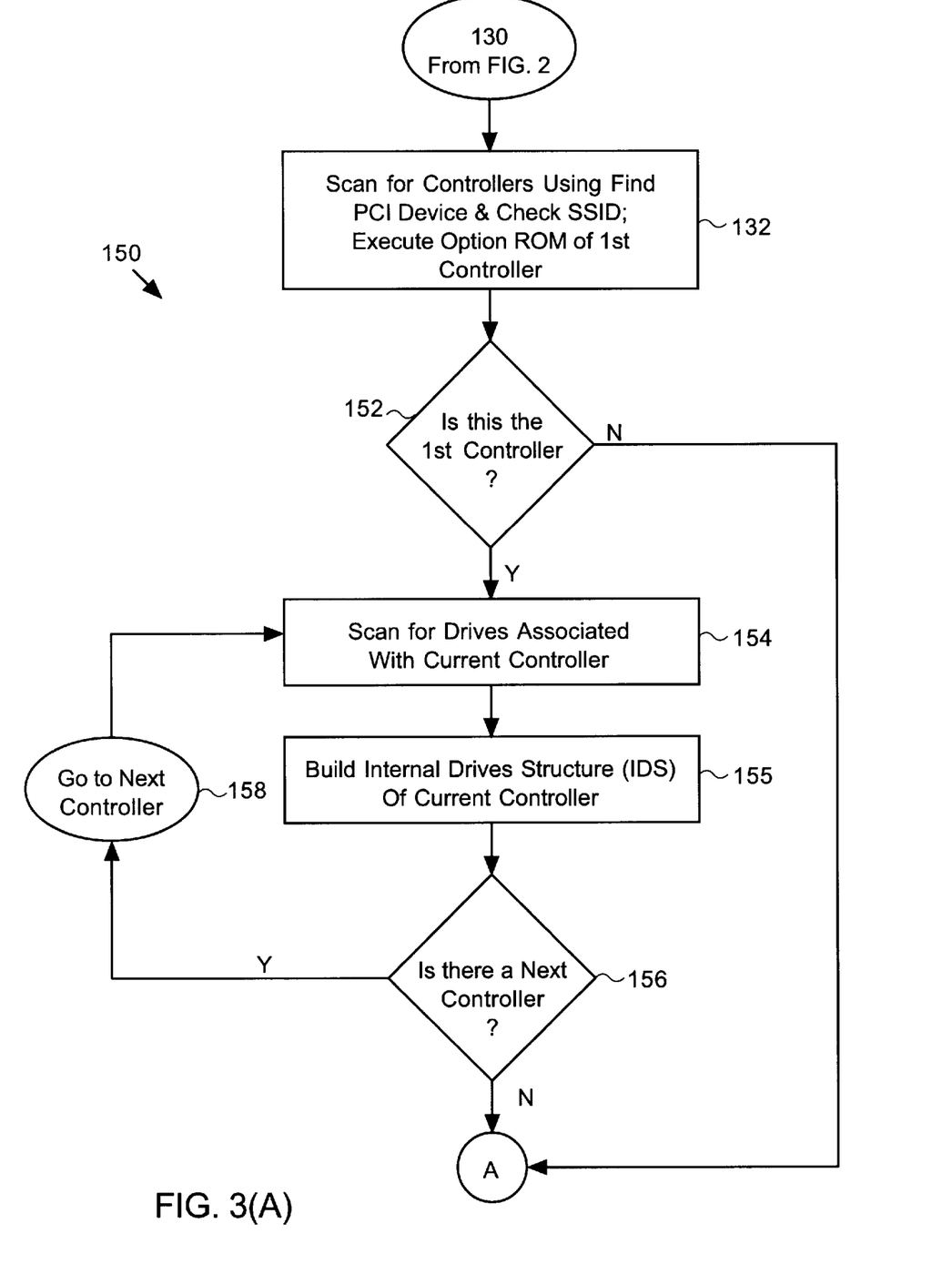
FIGS. 3(a)–3(c) are schematic flow charts depicting the boot sequence methodology according to the more detailed concepts of the present invention.

Upon execution of the first controller's BIOS initialization code, an initial drive structure (IDS) 150' is created for each of the controllers present in the computer system's plurality of expansion slots (i.e., for each adapter card). As discussed more thoroughly below with reference to FIG. 3(*a*), building of the initial drives structure at 150 involves ascertaining the various types of peripheral devices or drives associated with each the controllers. Thereafter, a suppression procedure occurs at 160 to disable the option ROM BIOS of all the controllers present with the exception of this first controller. That is, the option ROM BIOS of controllers 2 through N will not be stored into the reserved memory portion of the system RAM later on, as distinguished from the explanation discussed above with reference to prior art FIGS. 1(*c*) and 1(*d*).

Once suppression has occurred, a global drives structure (GDS) is built at 170 to organize within memory the various controllers and their associated drives according to a pre-defined boot sequence priority defined by the user. Thus, the GDS is in the form of a listing of drives each having an addressable location within system RAM. An entry pointer is associated with a first one of these drives, which corresponds to the pre-defined boot sequence priority, so that the computer system can boot from this first entry point of the GDS, as shown at 180. This completes execution of the system BIOS so that the system BIOS is exited at 190 and the boot sequence will be done.

Figure 3B:
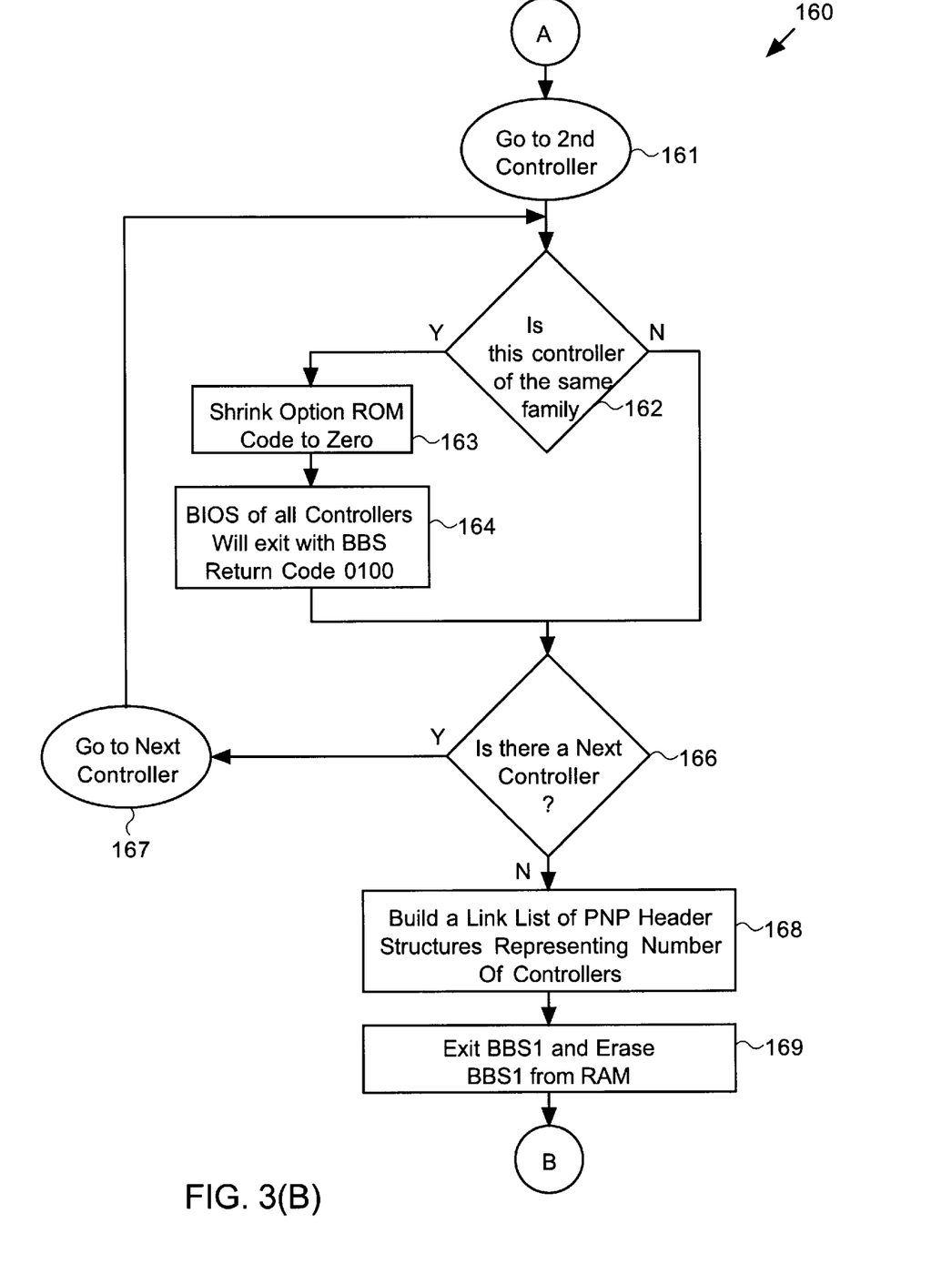
Figure 3C:
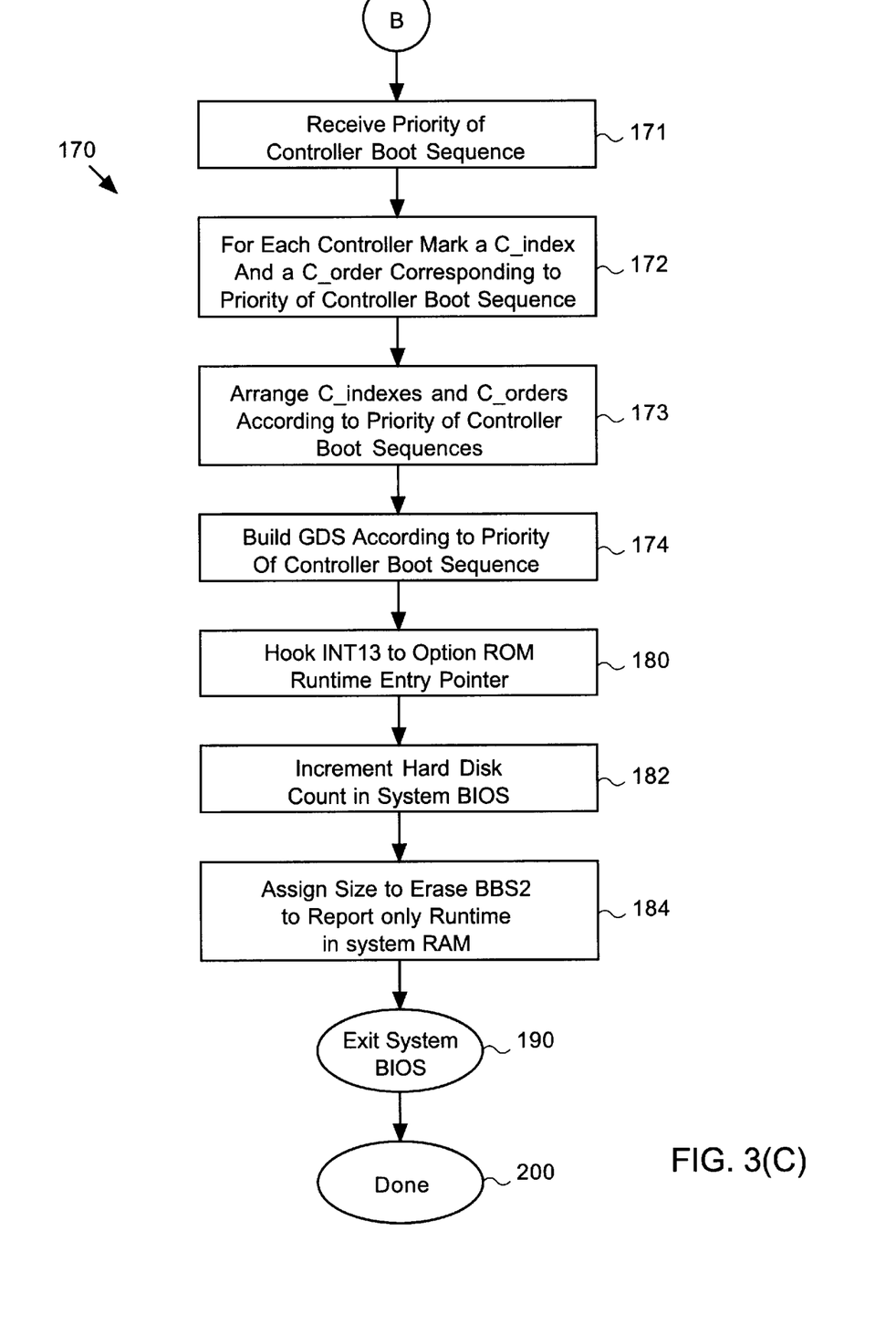

The boot sequence 100 of the present invention may be better appreciated now with reference to the more detailed flow charts of FIGS. 3(*a*)–3(*c*). Following boot up at 120 and execution of system BIOS at 130, it is first necessary for the computer system to ascertain certain identifying information pertaining to the various controllers residing in the expansion slots. This is preferably accomplished using a standard PCI call known as FindPCIDevice. At this point, the Option ROM of the first controller is loaded into system RAM and executed. A PCI standard code known as INT1ah is implemented to scan for the various controllers at 132 to determine the number of controllers which exist, by checking their PCI device ID for each controller. As stated above, the Option ROM for the first controller includes its BIOS initialization code and its run time code. The BIOS initialization code for the first controller's Option ROM is illustrated as 134 in FIG. 4. The BIOS initialization code 134 for the first controller has two BIOS boot specifications, referred to and shown in FIG. 4 as "BBS1" and "BBS2". While BBS in general is not new, it is believed that one of the unique aspects of the present invention is utilizing BBS to ascertain which controller and/or drive to boot from.

Figure 4:
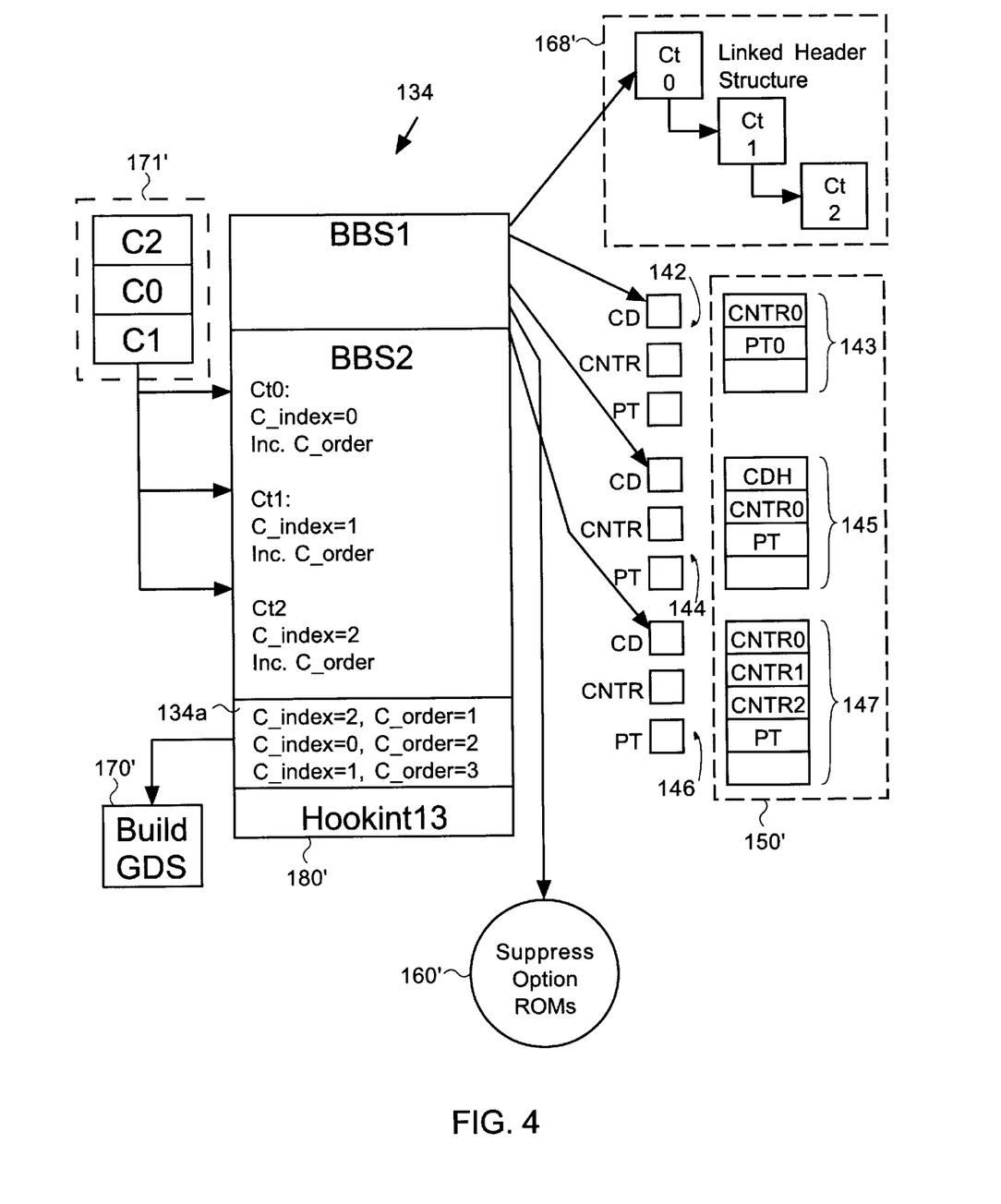
FIG. 4 is a block diagram of the computer system's BIOS initialization code for executing the boot sequence according to the present invention.

In one embodiment, building the IDS 150 begins at 152 where a determination is made by the BBS1 portion of the initialization routine as to whether the computer system is communicating with the first controller. If the answer to this inquiry is a logic "YES" then, at 154, BBS1 scans for the drive(s) associated with the first controller. The various types of drives associated with controllers may take on a variety of forms, such as passthrough (PT) drivers, bootable CD ROM drivers, containers (CNTR) as illustrated in FIG. 4. Of course, it should be readily appreciated by the ordinarily skilled artisan, that various other types of drives may exist within the computer system so that those discussed herein are for explanatory purposes only. It is preferred, though certainly not necessary, to sequentially scan each controller for bootable CD ROM drivers, then containers and thereafter pass-through drivers. This scanning sequence is illustrated by the three arrays of boxes 142, 144 and 146 shown in FIG. 4.

Accordingly, and as also shown in FIG. 4, a scan of the first controller generates a first internal drive sub-structure 143 associated with IDS 150. Once the first controller is fully scanned, a determination is made at 156 in FIG. 3(*a*) as to whether a next controller exists. If the answer to this inquiry is a logic "YES" then at 158 BBS1 goes to the next controller and repeats operations 154 and 155 to scan for drives associated with the next controller and build its internal drive sub-structure. This subroutine is repeated until a logic "NO" is received at determination stage 156.

For representative purposes only, FIG. 4 illustrates a situation where the computer system has three associated controllers, C0, C1 and C2 so that, when the entire IDS 150 is built, it includes a sub-structure 143 associated with controller C0, a substructure 145 associated with controller C1 and a sub-structure 147 associated with controller C2. As shown in FIG. 4, each of these sub-structures may contain different numbers and types of drives. It should be appreciated that the present invention should not be unnecessarily limited to the sub-routine discussed herein because other types of sub-routines are certainly contemplated for constructing IDS 150. For example, the scanning could take place for different types of drives other than those discussed herein. also, though perhaps less efficient, it is also contemplated that a particular type of drive could be sequentially scanned for each of the controllers before scanning for other types of drive(s) connected to the controllers.

Eventually, then, a determination is made at 156 in FIG. 3(*1*) that all controllers present have been scanned, resulting in a logic "NO" at node A. At this point, the suppression 160 of the Option ROM BIOS on all controllers, with the exception of the first controller, begins. It is necessary, then, for BBS1 to determine whether the controllers to be suppressed are of a particular type. It is common for this determination to be made prior to, and independent from, a boot sequence. However, it is contemplated that this determination may also be made as part of the boot sequence, as illustrated in FIG. 3(*b*). In any event, the initialization proceeds to the second controller at 161 and makes a determination at 162 as to whether this controller is of the same family type. If the answer to this inquiry is "YES," then the Option ROM of this controller is suppressed by disabling bit 0 in expansion ROM base address register in PCI configuration space at 163, if 163 fails then the corresponding option ROM BIOS of the controller should be existing with a BBS return code of 0100 at stage 164.

Once the controller's Option ROM has been disabled, then a determination is made at 166 as to whether there is a next controller. If the answer to this inquiry is "YES" then the initialization routine proceeds to the next controller at 167 and suppresses its Option ROM in a similar manner. This suppression sub-routine 160 is, therefore, repeated for each of the controllers associated with the computer system so that eventually inquiry 166 returns a "NO". It should be understood, then, that this suppression sub-routine at 160 results in initialization only for controller C0 so that the Option ROM associated with the remaining controllers C2 through C*n* will never have a chance to be executed.

The next step in the boot sequence is the building of a link list 168' of PNP header structures representing the number of controllers, as shown at operation stage 168 in FIGS. 3(*b*) and 4. For the exemplary three controller computer system described herein, this link list 168' is a data structure having a pointer that points to a selected number of entry addresses in the code, in this case addresses $C_{r0}$, $C_{r1}$ and $C_{r2}$. These entry addresses permit initialization to, respectfully, access the drive data for the various controllers contained in the initial drive sub-structures 143, 145 and 147. Once the link list has been created, BBS1 is existed and erased from the system RAM at stage 169.

Figure 5:
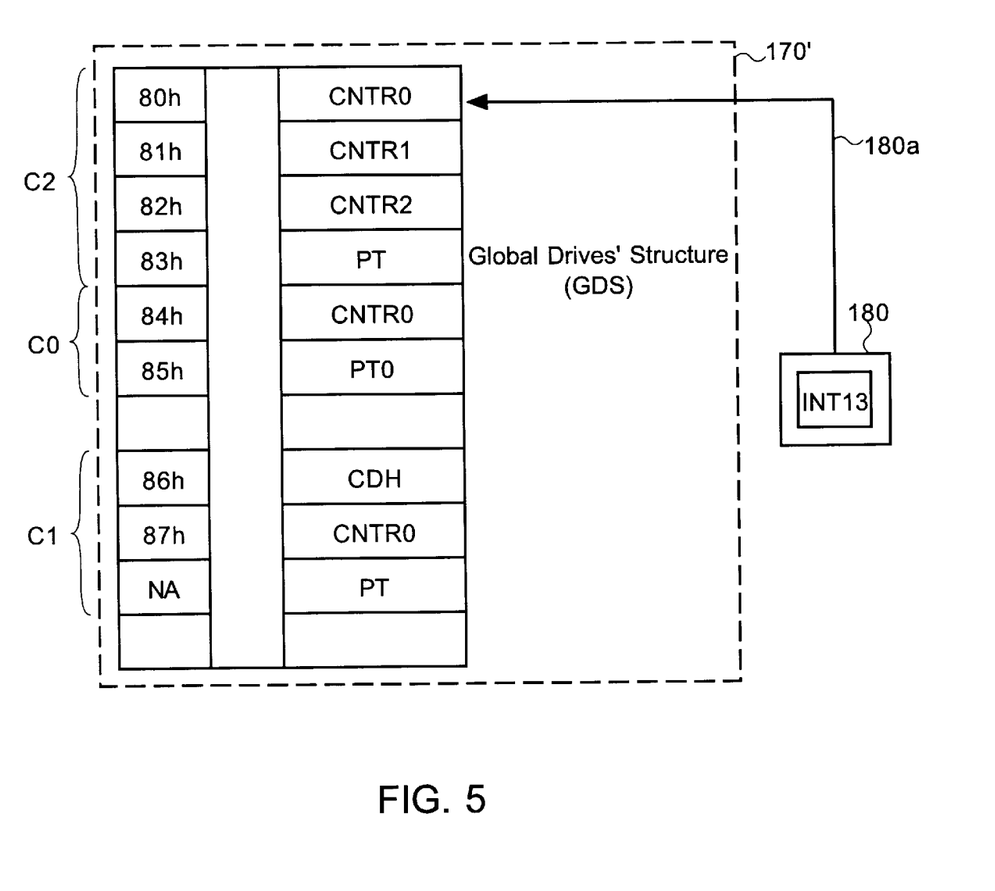
FIG. 5 is a block diagram of the global drive's structure (GDS) created during the boot sequence according to the present invention.

The BBS portion of the initialization code associated with the first controller's Option ROM is then utilized to create the global drive's structures (GDS) 170'. An exemplary sub-routine for creating GDS 170 may be appreciated now with reference to FIGS. 3(*c*), 4 and 5. With initial reference to FIGS. 3(*c*) and 4, a boot sequence priority is received at 171 according to information stored in the computer's CMOS 171' set by the user. This pre-defined boot sequence priority designates a selected one of the controllers as a boot controller. As shown in FIG. 4, and for illustrative purposes, the CMOS 171' designates controller C2 as the highest priority boot controller, followed by controllers C0 and C1.

In response to the boot sequence priority, BBS2 assigns both an index value and an order value to each of the controllers in the link list, as shown at 172 in FIG. 3(*c*). The index value corresponds to the controller's number so that controller $C_{r0}$ has a C__index=0, controller $C_{r1}$ has a C__index=1 and controller $C_{r2}$ has a C__index=2. The order value assigned in BBS2 corresponds directly to the controller boot sequence priority. In this case, then, controller $C_{r2}$ has a C__order=1, controller $C_{r1}$ has a C__order=2, and controller $C_{r1}$ has a C__order=3 as shown at 134*a*. At 173, these C__indexes and C__orders are arranged according to the priority of controller boot sequence to generate the GDS at stage 174.

As shown in FIG. 5, GDS 170' is in the form of a listing of drives each having an addressable location within memory. GDS 170' is created as a local structure, and is built according to the boot sequence priority so that the drives for controller C2 appear first in the listing, as an example between drive values 80h through 83h. The drives for controller C0, the second pre-defined controller in the boot sequence, appear at values 84h and 85 h. The drives for controller C1, then, appear in the GDS listing beginning at value 86 h.

It should be understood, then, that once it is built, GDS 170' includes a listing of all the drives associated with all of the controllers within the computer system. A comparison of GDS 170' in FIG. 5 to IDS 150' in FIG. 4 reveals that the difference between these two data structures is in the organization of the controllers and their drives. This, of course, results from the fact that IDS 150' is built prior to receipt of the BBS boot sequence priority, whereas GDS 170' is built after receipt of, and in accordance with, the boot sequence priority BBS.

An entry pointer 180*a* is associated with a first one of the drives in GDS 170, here drive CNTR0 associated with controller C2, so that when a hook INT13 call is done by the option ROM, the computer system boots from this drive, thereby to execute the run time code for the designated boot controller C2. Once this done, the hard disk count in system BIOS is incremented at 182 in FIG. 3(*c*) by option ROM to indicate the total found drives. BBS2 is erased by system BIOS at 184 to report run time only in system RAM. System BIOS is then exited at 190 to complete the boot sequence at 200.

The present invention may be implemented using an appropriate type of software driven computer-implemented operation. As such, various computer-implemented operations involving data stored in computer systems to drive computer peripheral devices may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiment is to be considered as illustrative and not restrictive, and the invention is not to be limited to the details given herein, but may be modified within the scope and equivalents of the appended claims.

What is claimed is:

1. A boot sequence adapted for use with a computer system during execution of system BIOS, wherein said computer system includes a random access memory (RAM) and a selected number of controllers, each of said controllers residing in a respective expansion slot and having at least one drive associated therewith and an option read only memory (Option ROM) that includes a BIOS initialization code and a runtime code, said boot sequence comprising:

ascertaining the number of controllers residing in said expansion slots;

executing the BIOS initialization code associated with a first one of said controllers to create within the RAM an initial drives' structure (IDS) corresponding to said controllers;

suppressing the Option ROM of all but the first one of said controllers;

building within the RAM a global drives' structure (GDS) corresponding to a predefined boot sequence priority that designates a selected one of said controllers as a boot controller, said GDS in the form of a listing of drives each having an addressable location within the readable memory, there being an entry pointer associated with a first one of said drives in said GDS; and booting from said entry pointer thereby to execute the runtime code for the boot controller.

2. A boot sequence according to claim 1 wherein said operation of ascertaining the number of controllers is accomplished by using a FindPciDevice PCI call to retrieve identifying information associated with each of said controllers.

3. A boot sequence according to claim 1 wherein said IDS is created by scanning for selected types of drives to obtain drive data associated with each of said controllers.

4. A boot sequence according to claim 3 wherein said controllers are sequentially scanned for the selected types of drives.

5. A boot sequence according to claim 1 wherein said operation of suppressing is accomplished by disabling the Option ROM of all but the first one of said controllers.

6. A boot sequence according to claim 1 wherein said operation of building the GDS includes creating within said RAM a link list of header structures correlated to the selected number of controllers, there being an initialization code entry address for each of said controllers in said link list.

7. A boot sequence according to claim 6 wherein said operation of building the GDS further includes assigning an order value to each of said controllers in said link list according to the pre-defined boot sequence priority.

8. A boot sequence according to claim 7 wherein the listing for said GDS is generated by sequentially storing into the RAM, according to said order value, the drive data associated with each of said controllers.

9. A boot sequence according to claim 1 wherein said IDS is created by scanning for selected types of drives to obtain drive data associated with each of said controllers, and wherein said operation of building the GDS includes creating within said RAM a link list of header structures correlated to the selected number of controllers, there being an initialization code entry address for each of said controllers in said link list.

10. A boot sequence according to claim 9 wherein said operation of building the GDS further includes assigning an order value to each of said controllers in said link list according to the pre-defined boot sequence priority, and wherein the listing for said GDS is generated by sequentially storing into the RAM, according to said order value, the drive data associated with each of said controllers.

11. A boot sequence according to claim 1 wherein said operation of executing is followed by an initial operation of loading into the RAM the BIOS initialization code associated with the first one of said controllers.

12. A boot sequence adapted for use with a computer system during execution of system BIOS, wherein said computer system includes read only memory (ROM) with a boot program stored therein, an addressable random access memory (RAM), and a selected number of controllers residing in respective expansion slots, each of said controllers having at least one drive associated therewith and an option read only memory (Option ROM) that includes a BIOS initialization code and a runtime code, said boot sequence comprising:

scanning each of said controllers to retrieve identifying information pertaining thereto;

loading said boot program into the system RAM;

loading into the system RAM the BIOS initialization code associated with a first one of said controllers;

executing the BIOS initialization code of the first one of said controllers;

building within a first portion of the system RAM an initial drives' structure (IDS) corresponding to said controllers;

suppressing the Option ROM of all but the first one of said controllers;

building within a second portion of the system RAM a global drives' structure (GDS) corresponding to a pre-defined boot sequence priority that designates a selected one of said controllers as a boot controller, said GDS in the form of a listing of drives each having an addressable location within the system RAM, there being an entry pointer associated with a first one of said drives in the GDS; and booting from said entry pointer thereby to execute the runtime code for the boot controller.

13. A boot sequence according to claim 12 wherein said operation of scanning is accomplished by using a FindPciDevice call.

14. A boot sequence according to claim 12 wherein the BIOS initialization code of the first one of said controllers is loaded, inclusively, between addresses C800h and D000h of the system RAM.

15. A boot sequence according to claim 12 wherein the operation of building the IDS is accomplished by sequentially scanning each of said controllers for selected types of drives to obtain drive data associated with each of said controllers.

16. A boot sequence according to claim 12 wherein said operation of suppressing is accomplished by disabling the Option ROM of all but the first one of said controllers.

17. A boot sequence according to claim 12 wherein the operation of building the GDS includes creating a link list of header structures correlated to the selected number of controllers, there being an initialization code entry address with the system RAM for each of said controllers in said link list.

18. A boot sequence according to claim 17 wherein said operation of building the GDS further includes assigning an order value to each of said controllers in said link list according to the pre-defined boot sequence priority and thereafter sequentially storing into the system RAM, according to said order value, the drive data associated with each of said controllers.

19. A boot sequence according to claim 12 wherein the address for said entry pointer is $80_h$.

20. A boot sequence according to claim 19 wherein said operation of booting is accomplished by an INT13 call.

21. A boot sequence according to claim 12 including the operations of erasing both the first memory portion and the second memory portion from the system RAM.

22. A boot sequence adapted for use with a computer system during execution of system BIOS, wherein said computer system includes read only memory (ROM) with a boot program stored therein, an addressable random access memory (RAM), and a selected number of controllers residing in respective expansion slots, each of said controllers having at least one drive associated therewith and an option read only memory (Option ROM) that includes a BIOS initialization code and a runtime code, said boot sequence comprising:

executing the BIOS initialization code of the first one of said controllers;

building within the system RAM an initial drives' structure (IDS) corresponding to said controllers;

creating within a first portion of the system RAM a link list of header structures correlated to the selected number of controllers;

suppressing the Option ROM of all but the first one of said controllers; and building within a second portion of the system RAM a global drives' structure (GDS) corresponding to a pre-defined boot sequence priority that designates a selected one of said controllers as a boot controller, said GDS in the form of a listing of drives each having an addressable location within the system RAM, there being an entry pointer associated with a first one of said drives in the GDS.

23. A boot sequence according to claim 22 including an operation of erasing said first portion of the system RAM after building said GDS.

* * * * *